Aug. 29, 1933.  A. WAHLERS  1,925,064
LOCK NUT
Filed April 12, 1932
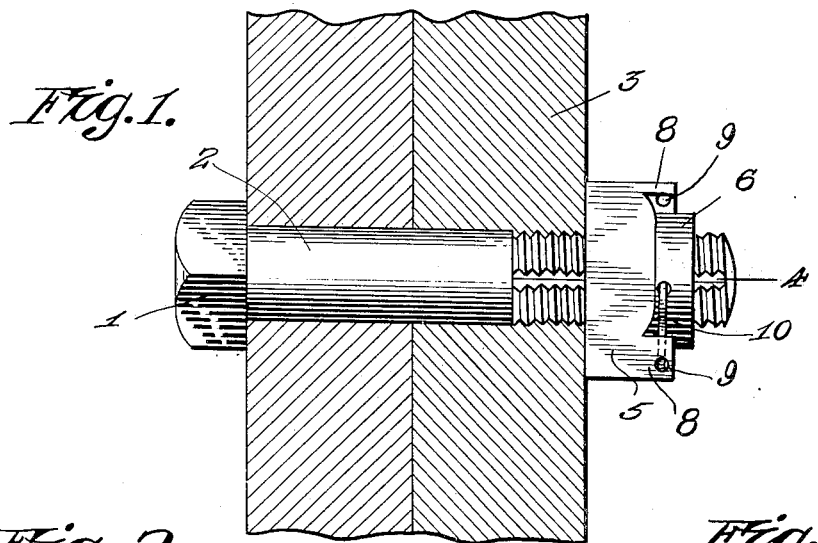
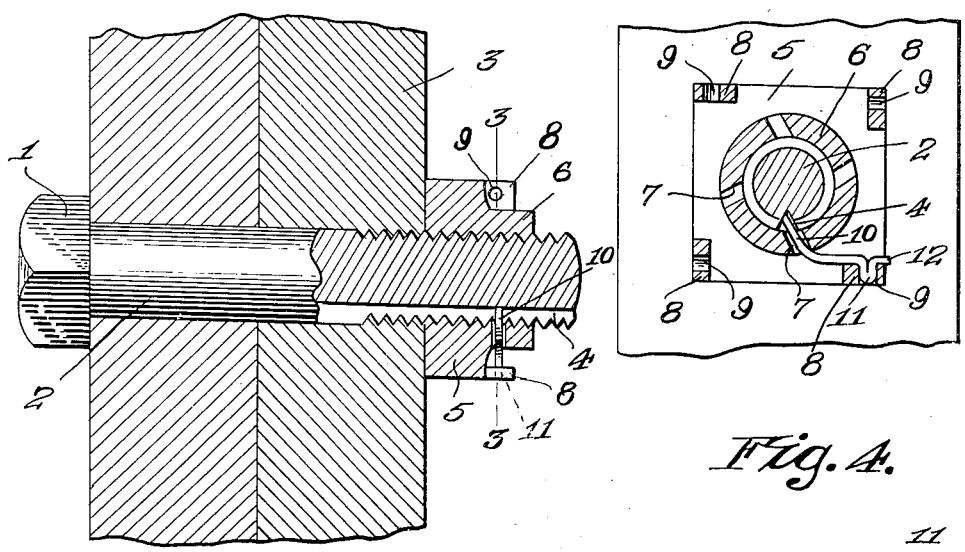
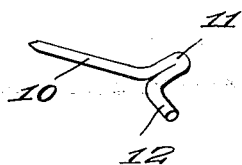
August Wahlers, INVENTOR
BY Victor J. Evans & Co. ATTORNEY Patented Aug. 29, 1933

1,925,064

UNITED STATES PATENT OFFICE 1,925,064

LOCK NUT

August Wahlers, San Diego, Calif.

Application April 12, 1932. Serial No. 604,784

2 Claims. (Cl. 151—11)

My present invention has reference to a simple, but thoroughly efficient means for locking a nut on a bolt and which is also of a construction to permit of the unscrewing of the nut from the bolt should occasion require.

A further object is the provision of a lock nut employed in connection with a bolt whose shank is grooved longitudinally, the said nut having a rounded extension on its outer face which surrounds its bore and which has interior threads that coincide with the threads in the bore, the said extension being provided with an opening which, when the nut is screwed home on the bolt, will register with the groove therein, while the corners of the nut are provided with lug extensions which are apertured for the reception of an offset or angle end portion on a spring and rustproof locking pin, which pin after being passed through the opening in the nut extension and received in the groove of the bolt is sprung upon itself to permit of the said angle or offset end of the locking element being received in the aperture of any one of the mentioned corner lugs, whereby the nut is effectively locked on the bolt, the removal of the locking element permitting the unscrewing of nut from the bolt.

To the attainment of the foregoing the invention consists in the improvement hereinafter described and definitely claimed.

In the drawing:

Figure 1 is a side elevation of the improvement, the structure connected by the nut and bolt being in section.

Figure 2 is a similar view with a portion of the bolt and the nut being in section.

Figure 3 is a sectional view approximately on the line 3—3 of Figure 2.

Figure 4 is a perspective view of the locking member.

A headed bolt 1 has its shank 2 passed through the plates 3 of a structure. The threaded end of the shank from its outer end is provided with a longitudinal groove 4. The opposed walls of the groove are preferably arranged at opposite angles with respect to each other and, therefore, the groove is substantially V-shaped.

Screwed on the bolt there is a nut 5. The nut is designed to be forced against the plate of the structure 1 opposite that contacted by the head of the bolt. The nut 5 on its outer face is provided with a rounded extension 6 whose bore is threaded and the said threads coincide with the threads in the bore of the nut and this extension 6 is provided with equidistantly spaced angularly arranged openings 7, four in number.

The corners on the outer face of the nut are provided with lug extensions 8, each provided with an opening 9 that communicates with the respective sides or faces of the nut.

When the nut is screwed home on the bolt I insert through one of the openings 7 that aline with the groove in the bolt the pointed end of a straight rod 10. The rod is of spring metal and is galvanized or otherwise suitably coated to prevent the deterioration thereof by water or rust. The rod is bent upon itself to provide an angle finger 11 disposed inward of its non-pointed end 12. The lock rod, after being inserted in the said opening 7 and groove 4 is sprung to permit of its finger 11 being received in the opening 9 in one of the lugs 8, while the extension 12 affords a finger grip for removing the finger portion 11 of the lock rod from the opening in the lug when the lock is to be removed to permit of the nut being screwed off of the bolt. If desired, the bolt may be provided with more than one groove so that when the same is screwed home at least one of the grooves will be in proper register with one of the openings 7 and also the lock rod may be inserted through one of the openings 7 in the extension 6 after being anchored in the lug 8 just prior to the final turning of the nut in a homeward direction on the bolt. The pointed end of the lock rod is under these conditions received between the threads of the bolt and will ride therefrom into the groove 4 when the nut is screwed home.

It is thought that the foregoing description when read in connection with the accompanying drawing will fully and clearly set forth the simplicity and advantages of my lock nut to those skilled in the art to which the invention relates so that further detailed description will not be required.

While not disclosed by the drawing an outer nut may be screwed upon the bolt 2 to cover the nut 5 to conceal the locking means carried by the nut 5.

Having described the invention, I claim:

1. A bolt having its threaded shank grooved longitudinally and a nut which is screwed on the bolt, said nut having on its outer face an extension that surrounds the bore of the nut and which is provided with equidistantly spaced angularly disposed openings, said nut having its corners provided with lugs which are apertured and the said apertures being directed toward the respective sides of the nut, a lock pin comprising a comparatively strong spring rust-proof rod which has a pointed end to be inserted through one of the openings in the nut extension and to be received in the groove of the bolt, said lock rod having, adjacent its non-pointed end, angularly arranged finger designed to enter the opening in one of the lugs when the rod is sprung to arrange the finger opposite said opening.

2. A bolt having its threaded shank grooved longitudinally and a nut which is screwed on the bolt, said nut having on its outer face an extension that surrounds the bore of the nut and which is provided with equidistantly spaced angularly disposed openings, said nut having its corners provided with lugs which are apertured and the said apertures being directed toward the respective sides of the nut, a lock pin comprising a comparatively strong spring rust-proof rod which has a pointed end to be inserted through one of the openings in the nut extension and to be received in the groove of the bolt, said lock rod having adjacent its non-pointed end an angularly arranged finger designed to enter the opening in one of the lugs when the rod is sprung to arrange the finger opposite said opening and said rod having an extension beyond its finger.

AUGUST WAHLERS.